United States Patent
Kwak et al.

(10) Patent No.: US 9,356,814 B2
(45) Date of Patent: *May 31, 2016

(54) METHOD OF TRANSMITTING CONTROL SIGNALS IN WIRELESS COMMUNICATION SYSTEM

(71) Applicant: LG ELECTRONICS INC., Seoul (KR)

(72) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/730,951

(22) Filed: Jun. 4, 2015

(65) Prior Publication Data

US 2015/0270998 A1    Sep. 24, 2015

Related U.S. Application Data

(63) Continuation of application No. 14/478,686, filed on Sep. 5, 2014, now Pat. No. 9,084,247, which is a continuation of application No. 14/035,807, filed on Sep. 24, 2013, now Pat. No. 8,861,330, which is a
(Continued)

(30) Foreign Application Priority Data

Jan. 29, 2008   (KR) .................. 10-2008-0009192

(51) Int. Cl.
*H04L 1/00*   (2006.01)
*H04L 27/26*   (2006.01)
(Continued)

(52) U.S. Cl.
CPC .......... *H04L 27/2608* (2013.01); *H04L 1/0026* (2013.01); *H04L 5/006* (2013.01);
(Continued)

(58) Field of Classification Search
CPC .... H04L 5/0007; H04L 5/0008; H04L 5/0009
USPC ......... 370/203, 204, 205, 206, 207, 208, 210, 370/344, 347, 348
See application file for complete search history.

(56) References Cited

U.S. PATENT DOCUMENTS 6,937,558 B2    8/2005   Wakutsu
7,660,229 B2    2/2010   Papasakellariou et al.
(Continued)

FOREIGN PATENT DOCUMENTS

CN    1625164 A    6/2005
EP    1720310 A2   11/2006
(Continued)

OTHER PUBLICATIONS

R1-072358: 3GPPTSGRANWG1 #49: Kobe, Japan, May 7-11, 2007, LG Electronics Inc. "Consideration on control channel multiplexing structure with/without Sounding RS".
(Continued)

*Primary Examiner* — Dady Chery
(74) *Attorney, Agent, or Firm* — Dentons US LLP

(57) ABSTRACT

A method of transmitting control signals in a wireless communication system includes multiplexing a first control signal with a second control signal in a slot, the slot comprising a plurality of orthogonal frequency division multiplexing (OFDM) symbols in time domain, the plurality of OFDM symbols being divided into a plurality of data OFDM symbols and a plurality of reference signal (RS) OFDM symbols, wherein the first control signal is mapped to the plurality of data OFDM symbols after the first control signal is spread by a base sequence in the frequency domain, the RS is mapped to the plurality of RS OFDM symbols, the second control signal is mapped to at least one of the plurality of RS OFDM symbols, and transmitting the first control signal and the second control signal in the slot.

20 Claims, 15 Drawing Sheets

Related U.S. Application Data continuation of application No. 13/457,987, filed on Apr. 27, 2012, now Pat. No. 8,570,852, which is a continuation of application No. 13/050,427, filed on Mar. 17, 2011, now Pat. No. 8,503,286, which is a continuation of application No. 12/451,049, filed as application No. PCT/KR2008/003339 on Jun. 13, 2008, now Pat. No. 7,929,415.

(60) Provisional application No. 60/944,074, filed on Jun. 14, 2007.

(51) Int. Cl.
*H04L 5/00* (2006.01)
*H04W 72/04* (2009.01)
*H04L 1/16* (2006.01)

(52) U.S. Cl.
CPC ............ *H04L 5/0021* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 27/262* (2013.01); *H04L 27/2605* (2013.01); *H04L 27/2613* (2013.01); *H04W 72/0413* (2013.01); *H04W 72/0446* (2013.01); *H04L 1/1671* (2013.01)

(56) References Cited

U.S. PATENT DOCUMENTS

| | | |
|---|---|---|
| 2003/0165133 A1 | 9/2003 | Garani |
| 2004/0014452 A1 | 1/2004 | Lim et al. |
| 2005/0128993 A1 | 6/2005 | Yu et al. |
| 2006/0171493 A1 | 8/2006 | Kim et al. |
| 2006/0262871 A1 | 11/2006 | Cho et al. |
| 2006/0285484 A1 | 12/2006 | Papasakellariou et al. |
| 2007/0206531 A1 | 9/2007 | Pajukoski et al. |

FOREIGN PATENT DOCUMENTS

| | | |
|---|---|---|
| KR | 10-0856198 B1 | 6/2003 |
| KR | 10-0876728 B1 | 2/2006 |
| RU | 2 154 913 C2 | 8/2000 |
| RU | 2 196 392 C2 | 1/2003 |
| WO | 98/49790 | 11/1998 |
| WO | 2005/050875 A1 | 6/2005 |
| WO | 2005/086520 A1 | 9/2005 |
| WO | 2007/055537 A1 | 5/2007 |
| WO | 2007055537 A1 | 5/2007 |

OTHER PUBLICATIONS

LG Electronics Inc., "Consideration on control channel multiplexing structure with/without Sounding RS", 3GPP TSG RAN WG1 #49, Kobe Japan, May 7-11, 2007, R1-072358.

Alactel-Lucent, "Multiplexing method for uplink non-data-associated control signals", 3GPP TSG RAN WG1 #49, Kobe Japan, May 7-11, 2007, R1-072399.

Nokia Siemens et al., "Multiplexing capability of CQIs and ACK/NACKs form different UEs", 3GPP TSG RAN WG1 #49, Kobe Japan, May 7-11, 2007, R1-072314.

Texan Instruments, "Transmission of Downlink CQI in E-UTRA Uplink", 3GPP TSG RAN WG1 #49, Kobe Japan, May 7-11, 2007, R1-072212.

Texas Instruments, "Simultaneous CQI and ACK/NAK Transmission in Uplink", GPP TSG RAN WG1 #50, R1-073431, Aug. 2007.

Samsung, "Uplink data-non-associated control multiplexing", 3GPP TSG RAN WG1 Meeting #49, R1-070963, Feb. 2007.

Motorola: "Multiplexing of UL L1/L2 control signals in the absence of data", 3GPP Draft; R1-072185 UL CCH Nodata, 3rd Generation Partnership Project (3GPP), Mobile Competence Centre; 650, Route Des Lucioles; F-06921 Sophia-Antipolis Cedex; France, vol. RAN WG1, no. Kobe Japan; May 2, 2007; XP050105925.

Alcatel-Lucent: "ACK/NAK Transmission without RS Overhead", 3GPP Draft; R1-071720, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105642.

NTT Docomo et al: "CDMA-Based Multiplexing Method for Multiple ACK/NACK and CQI in EUTRA Uplink", 3GPP Draft; R1-071649 UL CDMA-Based Multiplexing of Multiple ACKN and CQI, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105575.

METHOD OF TRANSMITTING CONTROL SIGNALS IN WIRELESS COMMUNICATION SYSTEM

This application is a continuation of U.S. application Ser. No. 14/478,686, filed Sep. 5, 2014, which is a continuation of U.S. application Ser. No. 14/035,807, filed Sep. 24, 2013 (now U.S. Pat. No. 8,861,330), which is a continuation of U.S. application Ser. No. 13/457,987, filed Apr. 27, 2012 (now U.S. Pat. No. 8,570,852), which is a continuation of U.S. application Ser. No. 13/050,427, filed Mar. 17, 2011 (now U.S. Pat. No. 8,503,286), which is a continuation of U.S. application Ser. No. 12/451,049, filed Oct. 23, 2009 (now U.S. Pat. No. 7,929,415), which is a U.S. National Phase entry of International Application No. PCT/KR2008/003339, filed on Jun. 13, 2008, and claims the benefit of U.S. Provisional Application No. 60/944,074, filed Jun. 14, 2007 and Korean Patent Application No. 10-2008-0009192, filed on Jan. 29, 2008, each of which are hereby incorporated by reference as if fully set forth herein.

TECHNICAL FIELD

The present invention relates to wireless communications, and more particularly, to a method of transmitting control signals in a wireless communication system.

BACKGROUND ART

In order to maximize efficiency under a limited radio resource in a wideband wireless communication system, methods for more effectively transmitting data in time, spatial, and frequency domains have been provided.

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

To maximize efficiency in the spatial domain, the OFDM/OFDMA-based system uses a multiple-antenna technique which is used as a suitable technique for high-speed multimedia data transmission by generating a plurality of time/frequency domains in the spatial domain. The OFDM/OFDMA-based system also uses a channel coding scheme for effective use of resources in the time domain, a scheduling scheme which uses a channel selective characteristic of a plurality of users, a hybrid automatic repeat request (HARQ) scheme suitable for packet data transmission, etc.

In order to implement various transmission or reception methods to achieve highspeed packet transmission, transmission of a control signal on the time, spatial, and frequency domains is an essential and indispensable factor. A channel for transmitting the control signal is referred to as a control channel. An uplink control signal may be various such as an acknowledgement (ACK)/negative-acknowledgement (NACK) signal as a response for downlink data transmission, a channel quality indicator (CQI) indicating downlink channel quality, a precoding matrix index (PMI), a rank indicator (RI), etc.

In general, a control channel uses more limited time/frequency resources than those used in a data channel. State information of a radio channel needs to be fed back in order to increase spectral efficiency of a system and a multi-user diversity gain. Therefore, effective design of the control channel is inevitable when large-sized data is fed back. In addition, the control channel has to be designed to have a good peak-to-average power ratio (PAPR)/cubic metric (CM) characteristic in order to reduce power consumed in a user equipment.

There is a need for a control channel structure capable of keeping good PAPR/CM characteristics while increasing transmission capacity.

DISCLOSURE OF INVENTION

Technical Problem

The present invention provides a method of simultaneously transmitting different control signals by using allocated time/frequency resources.

The present invention also provides a method of transmitting a plurality of control signals through a control channel.

Technical Solution

In an aspect, a method of transmitting control signals in a wireless communication system includes multiplexing a first control signal with a second control signal in a slot, the slot comprising a plurality of orthogonal frequency division multiplexing (OFDM) symbols in time domain, the plurality of OFDM symbols being divided into a plurality of data OFDM symbols and a plurality of reference signal (RS) OFDM symbols, the plurality of data OFDM symbols used to transmit the first control signal, the plurality of RS OFDM symbols used to transmit a RS, wherein the first control signal is mapped to the plurality of data OFDM symbols after the first control signal is spread by a base sequence in the frequency domain, the RS is mapped to the plurality of RS OFDM symbols, the second control signal is mapped to at least one of the plurality of RS OFDM symbols, and transmitting the first control signal and the second control signal in the slot.

A subframe can include two slots and each of the two slots in the subframe can use different subcarriers.

The first control signal can be a channel quality indicator (CQI) which represents downlink channel condition and the second control signal can be an acknowledgement (ACK)/negative-acknowledgement (NACK) signal for hybrid automatic repeat request (HARM).

The slot can include five data OFDM symbols and two RS OFDM symbols, and the two RS OFDM symbols are not contiguous with each other. The second control signal can be mapped to the last RS OFDM symbol in the slot.

The first control signal can use quadrature phase shift keying (QPSK) modulation and the second control signal can use QPSK or binary phase shift keying (BPSK) modulation.

In another aspect, a method of transmitting control signals in a wireless communication system includes transmitting a first control signal and a second control signal on an uplink control channel, a slot being used to transmit the uplink control channel, the slot comprising a plurality of OFDM symbols, wherein the second control signal is multiplexed with a RS which is used for the first control signal, the first control signal and the RS are transmitted in different OFDM symbols on the uplink control channel, and the second control signal is transmitted with the RS in one of OFDM symbols used for the RS, and wherein the first control signal uses QPSK modulation and the second control signal uses QPSK or BPSK modulation.

In still another aspect, a method of transmitting control signals in a wireless communication system includes configuring an uplink control channel carrying a first control signal and a second control signal, wherein the first control signal and a RS are transmitted in different OFDM symbols on the uplink control channel and the second control signal is multiplexed with the RS, and transmitting the first control signal and the second control signal on the uplink control channel.

Advantageous Effects

Transmission capacity for an uplink control channel can be increased, and a peak-to-average power ratio (PAPR)/cubic metric (CM) characteristic can be preserved.

MODE FOR THE INVENTION

Figure 1:
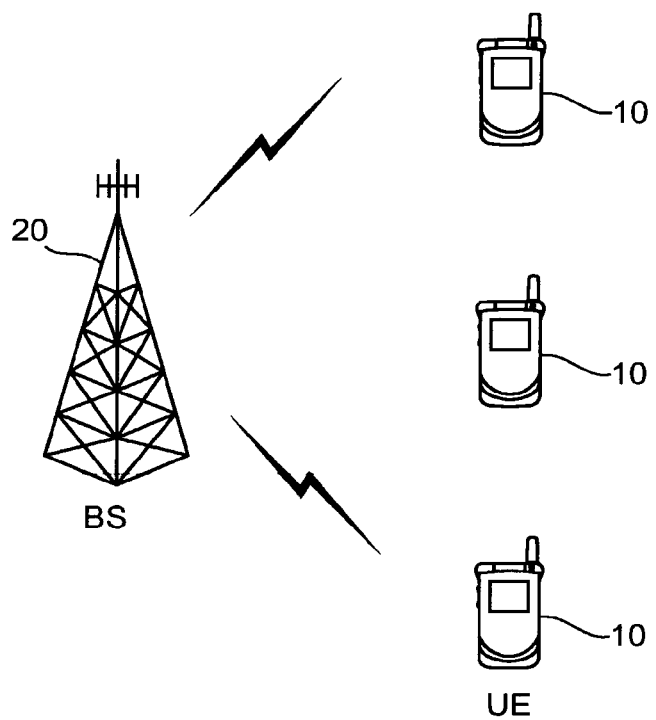
FIG. 1 shows a wireless communication system.

FIG. 1 shows a wireless communication system. The wireless communication system can be widely deployed to provide a variety of communication services, such as voices, packet data, etc.

Referring to FIG. 1, a wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication link from the BS 20 to the UE 10, and an uplink is defined as a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Figure 2:
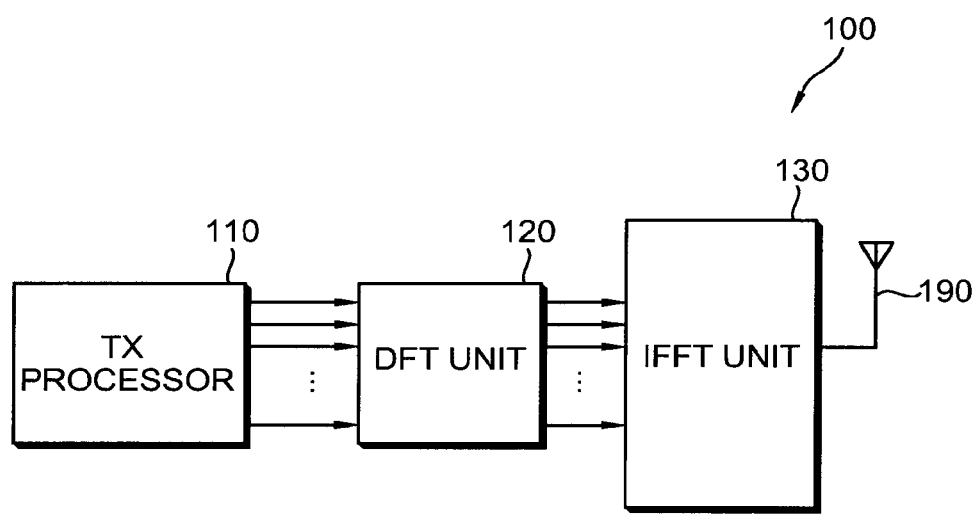
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a transmit (Tx) processor 110, a discrete Fourier transform (DFT) unit 120 that performs DFT, and an inverse fast Fourier transform (IFFT) unit 130 that performs IFFT. The DFT unit 120 performs DFT on data processed by the Tx processor 110 and outputs a frequency-domain symbol. The data input to the DFT unit 120 may be a control signal and/or user data. The IFFT unit 130 performs IFFT on the received frequency-domain symbol and outputs a Tx signal. The Tx signal is a time-domain signal and is transmitted through a Tx antenna 190. A time-domain symbol output from the IFFT unit 130 is referred to as an orthogonal frequency division multiplexing (OFDM) symbol. Since IFFT is performed after DFT spreading, the time-domain symbol output from the IFFT unit 130 is also referred to as a single carrier-frequency division multiple access (SC-FDMA) symbol. SC-FDMA is a scheme in which spreading is achieved by performing DFT at a previous stage of the IFFT unit 130 and is advantageous over the OFDM in terms of decreasing a peak-to-average power ratio (PAPR)/cubic metric (CM).

Figure 3:
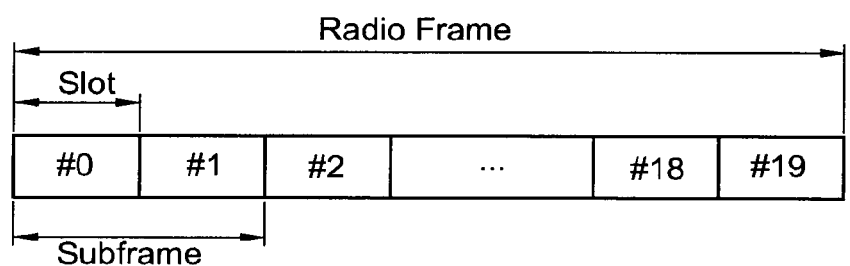
FIG. 3 shows an exemplary structure of a radio frame.

FIG. 3 shows an exemplary structure of a radio frame.

Referring to FIG. 3, a radio frame includes 10 subframes. One subframe can include two slots. One slot can include a plurality of OFDM symbols in a time domain and at least one subcarrier in a frequency domain. The slot is a unit of radio resource allocation in the time domain. For example, one slot can include 7 or 6 OFDM symbols. A resource block is defined by a slot in the time domain and a plurality of subcarriers in the frequency domain, and is a basic unit of radio resource allocation. It is assumed hereinafter that one resource block is defined by one slot and 12 subcarriers.

The radio frame structure is shown for exemplary purposes only, and thus the number of subframes included in the radio frame or the number of slots included in the subframe or the number of OFDM symbols included in the slot is not limited thereto.

Figure 4:
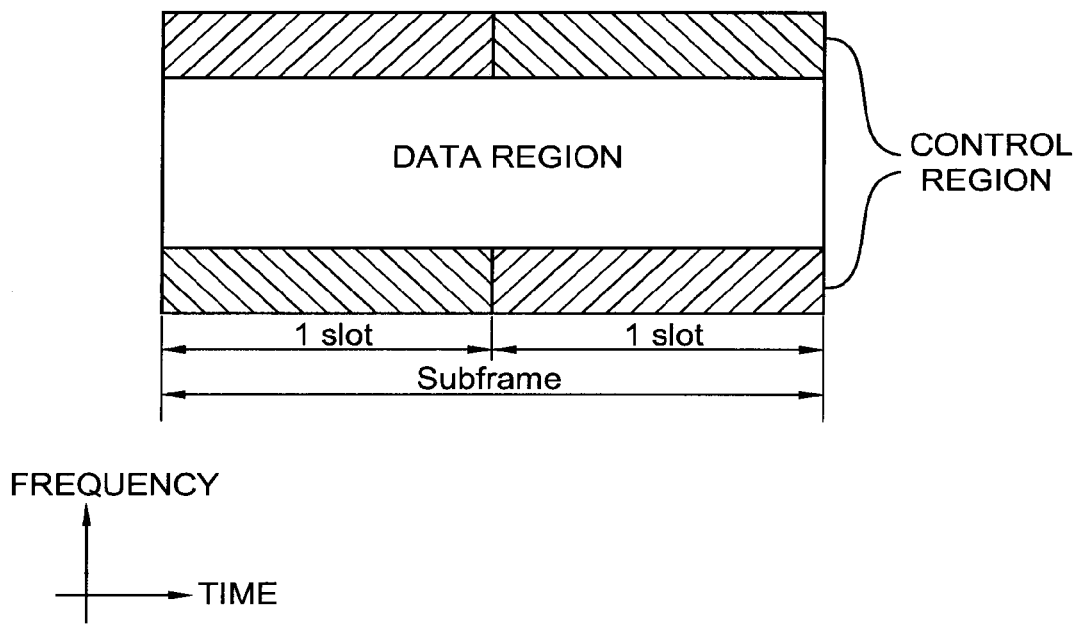
FIG. 4 shows an exemplary subframe.

FIG. 4 shows an exemplary subframe. The subframe may be an uplink subframe using SC-FDMA. A time for transmitting one subframe is defined as a transmission time interval (TTI).

Referring to FIG. 4, an uplink subframe can be divided into two parts, that is, a control region and a data region. Since the control region and the data region use different frequency bands, frequency division multiplexing (FDM) have been achieved.

The control region is used to transmit only the control signal and is assigned to a control channel. The data region is used to transmit data and is assigned to a data channel. The control channel transmits the control signal. The data channel transmits the user data and/or the control signal. The control channel and the data channel can be configured within one subframe. However, in order to keep a single-carrier property, the control channel and the data channel cannot be simultaneously transmitted by one UE within one subframe. The control channel can be referred to as a physical uplink control channel (PUCCH). The data channel can be referred to as a physical uplink shared channel (PUSCH). Examples of the control signal include an acknowledgement (ACK)/negative-acknowledgement (NACK) signal for hybrid automatic repeat request (HARQ), a channel quality indicator (CQI) indicating a downlink channel condition, a precoding matrix index (PMI) indicating a precoding matrix of a codebook, a rank indicator (RI) indicating the number of independent multiple input multiple output (MIMO) channels, a scheduling request (SR) for requesting uplink radio resource allocation, etc.

The control signal is carried on the control region. The user data and the control signal can be carried together on the data region. That is, when the UE transmits only the control signal, the control region can be assigned to transmit the control signal. In addition, when the UE transmits both the data and the control signal, the data region can be assigned to transmit the data and the control signal. In an exceptional case, even if only the control signal is transmitted, the control signal may be transmitted in a large amount or the control signal may be not suitable to be transmitted through the control region. In this case, a radio resource can be assigned to the data region to transmit the control signal.

In the control region, control channels of respective UEs can use different frequencies (or subcarriers) or different codes. Frequency division multiplexing (FDM) or code division multiplexing (CDM) may be used to identify each control channel.

Each of two slots included in one subframe can be frequency hopped. That is, one of the two slots included in one subframe is assigned to one side of a frequency band, and the other slot is assigned to the other side of the frequency band. A frequency diversity gain can be obtained by transmitting each control channel through the slots, each of which uses a different subcarrier.

For clarity, it will be assumed hereinafter that one slot consists of 7 OFDM symbols, and thus one subframe including two slots consists of 14 OFDM symbols in total. The number of OFDM symbols included in one subframe or the number of OFDM symbols included in one slot is shown for exemplary purposes only, and thus the technical scope of the present invention is not limited thereto.

Figure 5:
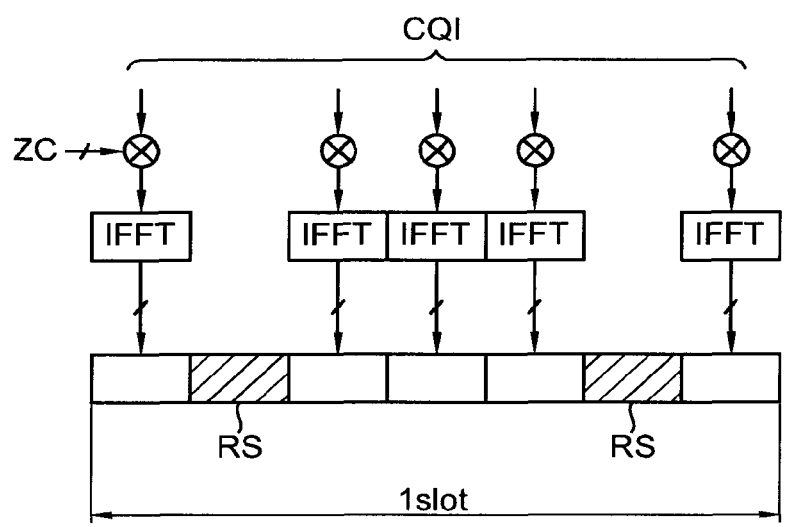
FIG. 5 shows a structure of a channel quality indicator (CQI) channel.

FIG. 5 shows a structure of a CQI channel. The CQI channel is used to transmit a CQI.

Referring to FIG. 5, one slot includes 7 OFDM symbols. A reference signal (RS) is assigned to two of the 7 OFDM symbols, and the CQI is assigned to the remaining 5 OFDM symbols. An OFDM symbol mapped to the CQI is referred to as a 'data OFDM symbol'. An OFDM symbol mapped to the RS is referred to as an 'RS OFDM symbol'. The location and the number of RS OFDM symbols may vary depending on a control channel. Changes in the location and the number of RS OFDM symbols may result in changes in those of data OFDM symbols.

When the control signal is transmitted on the CQI channel, frequency-domain spreading is used to increase the number of multiplexable UEs or the number of control channels. A frequency-domain spreading code is used to spread the CQI. A Zadoff-Chu (ZC) sequence is one example of a constant amplitude zero autocorrelation (CAZAC) sequence and is used as the frequency-domain spreading code. If the CQI channel is assigned with one resource block, a CAZAC sequence having a length of 12 is used.

A ZC sequence c(k) having a length of N can be generated as shown:

$$c(k) = \begin{cases} e^{-j\frac{\pi Mk(k+1)}{N}} & \text{for odd } N \\ e^{-j\frac{\pi Mk^2}{N}} & \text{for even } N \end{cases}$$

where 0≤k≤N−1, and M is a root index and is a natural number equal to or less than N. N is relatively prime to M. This means that, once N is determined, the number of root indices is equal to the number of available ZC sequences. UEs can be identified by using ZC sequences each having a different cyclic shift value. The number of possible cyclic shifts may vary depending on channel delay spread.

If the CQI channel is assigned with one resource block including 12 subcarriers and if 6 cyclic shifts are possible for the ZC sequence, then 6 UEs can be identified. If a CQI using quadrature phase shift keying (QPSK) modulation is mapped to each OFDM symbol, a 10-bit coded CQI can be transmitted in every slot. That is, a maximum of 10-bit CQI can be transmitted through one subframe. For example, 5 subframes are required to transmit a 50-bit CQI. When two or more resource blocks are assigned, the ZC sequence is increased in length and thus an additional spreading gain can be obtained. However, there is no change in the number of supportable UEs and transmission capacity. Accordingly, there is a need for a method in which different control signals are simultaneously transmitted by dividing allocated frequency resources to improve transmission capacity while maintaining the PAPR/CM characteristic.

Radio resources of a spatial domain in addition to time/frequency domains can be effectively utilized by transmitting various uplink control signals. Example of the various control signals to be transmitted include not only a large-sized control signal (i.e., CQI) but also relatively small-sized other control signals (i.e., ACK/NACK, SR, PMI, RI, etc.). The control signals can be transmitted through independent channel allocation. However, due to a characteristic of a spreading code, the PAPR/CM characteristic may be problematic when a plurality of control channels are simultaneously transmitted. In particular, since a MIMO-related control signal has a correlation with the CQI, the control signal may be preferably mapped to the CQI channel when transmitted. A 1 or 2 bit-control signal (i.e., ACK/NACK or SR) may be mapped to the large-sized control channel in order to increase spectral efficiency.

Structure of Multiplexed Control Channel

Now, a method of multiplexing a small-sized control signal (e.g., ACK/NACK, SR, etc.) through a control channel (e.g., CQI channel) for transmitting a large-sized control signal will be described. The small-sized control signal denotes a control signal whose size is smaller than the large-sized control signal. For example, the small-sized control signal may be a control signal having a small number of bits. However, the size of the control signal is not particularly restricted in the present invention.

Required transmission capacity differs according to a type and purpose of an uplink control signal. For example, feedback of channel information for a narrow band is required to obtain frequency and multi-user diversity gains through frequency selective scheduling. Therefore, when a CQI is transmitted in a wideband system, information having a size in the range of several bits to tens of bits is transmitted for a unit time (e.g., 1 TTI). On the contrary, when an ACK/NACK signal, an SR, a MIMO-related PMI, an RI, etc., are transmitted, information having a size in the range of 1 or 2 bits to several bits is transmitted if necessary. In case of the small-sized control signal, supportable UE capability may be more important than a transmittable symbol interval of a unit time duration. In addition, when different control signals are transmitted through a plurality of control channels, the PAPR/CM characteristic may deteriorate due to a spreading code property that maintains an excellent PAPR/CM within a unit channel.

Figure 6:
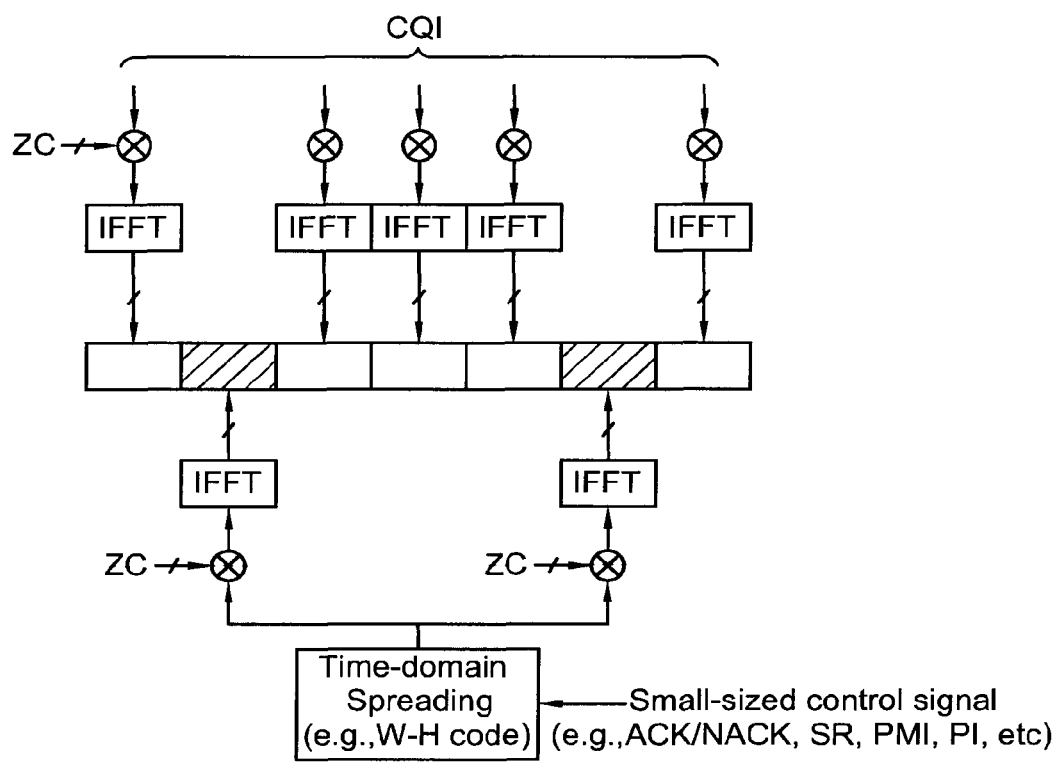
FIG. 6 shows a structure of a control channel according to an embodiment of the present invention.

FIG. 6 shows a structure of a control channel according to an embodiment of the present invention. With this structure, a small-sized control signal is multiplexed and transmitted through a CQI channel that can be regarded as a large-seized control channel.

Referring to FIG. 6, the CQI channel uses a spreading code based on a ZC sequence in a frequency domain. UEs are multiplexed by utilizing a maximum of 6 orthogonal codes by performing a cyclic shift. Accordingly, a CQI can be transmitted using 5 OFDM symbols in every slot.

The CQI channel uses two RSs for coherence detection. Small-sized control signals are mapped to two RS OFDM symbols. That is, the RSs are multiplexed with the small-sized control signals. A maximum of 12 orthogonal codes can be obtained by using two RS OFDM symbols. That is, a maximum of 12 two-dimensional orthogonal codes can be obtained by using an orthogonal spreading code (e.g., Walsh-Hadamard (W-H) code) in a time domain and by using 6 ZC sequences that can be obtained by performing 6 cyclic shifts in the frequency domain.

A plurality of bits per unit of transmission can be transmitted by selecting a different code in every slot. In addition, a diversity gain can be obtained through frequency hopping by selecting the same code in every slot. For example, if it is assumed that a 1-bit ACK/NACK signal or a 1-bit SR is used, an orthogonal code of (1,1) or (1, −1) may be transmitted by selecting a bit 0 (i.e., ACK) or a bit 1 (i.e., NACK) or may be carried and transmitted on a RS by selecting an ACK signal (i.e., (1,−1)) or a NACK signal (i.e., (−1,−1)). Further, if a 2-bit ACK/NACK signal is used, (1,1), (1,−1), (−1,−1), and (−1,1) may be used for (NACK,NACK) or discontinuous transmission (DTX), (ACK,ACK), (ACK,NACK), and (NACK,ACK), respectively.

The spreading code can be processed at a previous stage of processing the ZC sequence as shown in the figure. However, since a characteristic of the ZC sequence is maintained even after IFFT is performed, transmission may be performed through multiplication of the spreading code after the IFFT is performed.

Multiplexing of the small-sized control signal does not have an effect on transmission capacity of the CQI channel and UE capability. The small-sized control signal can use the spreading code in order to be multiplexed with a RS of the CQI channel (hereinafter simply referred to 'CQI RS'). In addition, the small-sized control signal can be multiplexed with the RS according to a modulation scheme using symbols of the small-sized control signal. For example, the RS may be multiplexed with a binary phase shift keying (BPSK) or QPSK-modulated ACK/NACK signal.

Each slot may use a different spreading code. Alternatively, two slots may use the same spreading code. A long spreading code can be used throughout a plurality of slots. For example, a spreading code having a length of 4 may be used for 4 RSs in two slots.

If the small-sized control signal is transmitted together with a CQI RS, coherent detection is used for the CQI and non-coherent detection is used for multiplexed other control signals. This is because the small-sized control signal is mapped to a RS OFDM symbol. A receiver may first reproduce a multiplexed control signal mapped to the RS OFDM symbol through non-coherent detection and then reproduce the CQI through coherent detection. If a two-dimensional orthogonal code is used, the receiver can reproduce the multiplexed control signal by performing a de-spreading process. If the control signal is multiplexed with the RS, coherent detection of the CQI may be influenced in terms of performance. However, loss can be minimized if the multiplexed control signal is a small-sized control signal. For example, if the multiplexed control signal has a size of 1 bit and if an orthogonal code of (1,1) or (1,−1) is transmitted by selecting a bit 0 or a bit 1, then the same data, i.e., 1, is transmitted for a first RS OFDM symbol. Therefore, coherent detection performance can be maintained at least with respect to one RS. Deterioration of coherent detection performance can be minimized by determining some of a plurality of RSs to "dedicated RSs" and the remaining RSs to "relative RSs".

Although two-dimensional orthogonal codes of the time domain and the frequency domain are used to multiplex the control signal, one-dimensional codes may also be used such as time-domain orthogonal codes or frequency-domain orthogonal codes.

Figure 7:
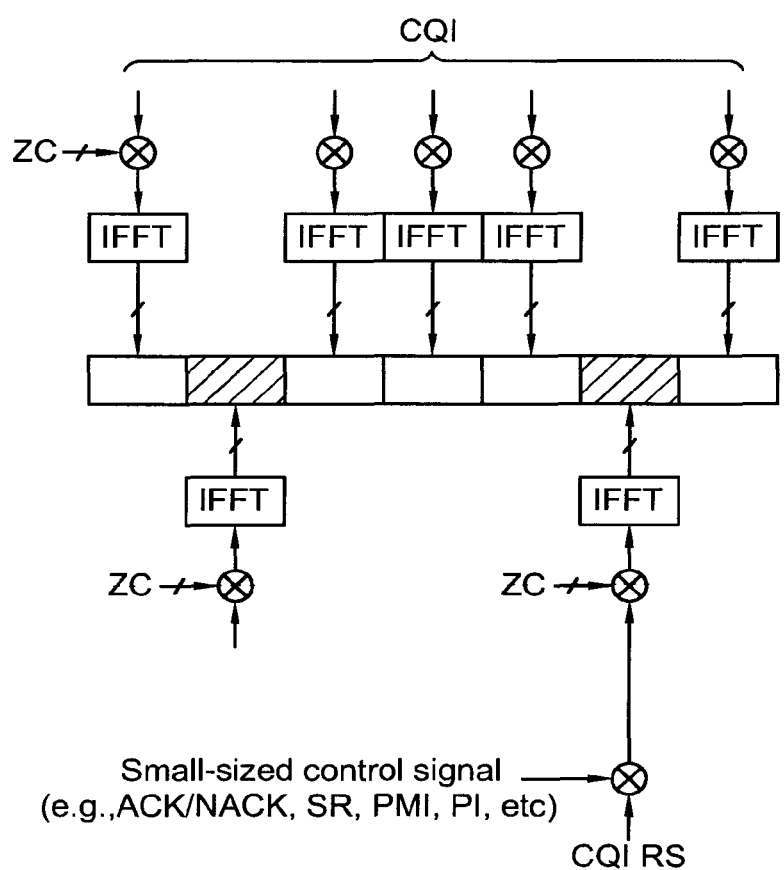
FIG. 7 shows a structure of a control channel according to another embodiment of the present invention.

FIG. 7 shows a structure of a control channel according to another embodiment of the present invention. With this structure, a small-sized control signal is multiplexed and transmitted through a CQI channel that can be regarded as a high-sized control channel.

Referring to FIG. 7, a CQI and a RS use different OFDM symbols. The small-sized control signal is multiplexed with one of a plurality of OFDM symbols to be assigned to the RS. Two RS OFDM symbols are assigned to the CQI channel. Between the two RS OFDM symbols, a first RS OFDM symbol is assigned to a CQI RS, and a second RS OFDM symbol is mapped with a small-sized control signal (e.g., an ACK/NACK signal) together with the CQI RS. That is, the small-sized control signal is multiplexed with the RS in the second RS OFDM symbol. For example, the CQI RS may be modulated and multiplexed by using a BPSK (i.e., 1-bit ACK/NACK) or QPSK (i.e., 2-bit ACK/NACK) symbol mapped to the ACK/NACK signal. Specifically, in case of a CQI channel that transmits 10-bit information bits by performing channel coding at a half code rate, 10 QPSK CQI modulation signals d(0) to d(9) are mapped to 5 OFDM symbols and transmitted in every slot. In this case, if an ACK/NACK signal of one or two bits is modulated using BPSK or QPSK, a single modulation symbol (i.e., d(10)) can be multiplexed with a RS and thus a maximum of 21 bits or 22 bits can be transmitted through one subframe (i.e., two consecutive frequency hopping slots). For example, the ACK/NACK signal can be multiplexed with the RS in such a manner that one modulated symbol is multiplied with a RS sequence.

Each slot may use a different modulation symbol. The same modulation symbol may be used in two slots. Although a RS is modulated at a previous stage of IFFT processing, it may be modulated in a next stage of the IFFT processing.

The location of the RS OFDM symbol to which the small-sized control signal is multiplexed is shown for exemplary purposes only, and thus the present invention is not limited thereto. Not only the second RS OFDM symbol but also the first RS OFDM symbol can be multiplexed, and the location of the OFDM symbol multiplexed in every slot may change.

Figure 8:
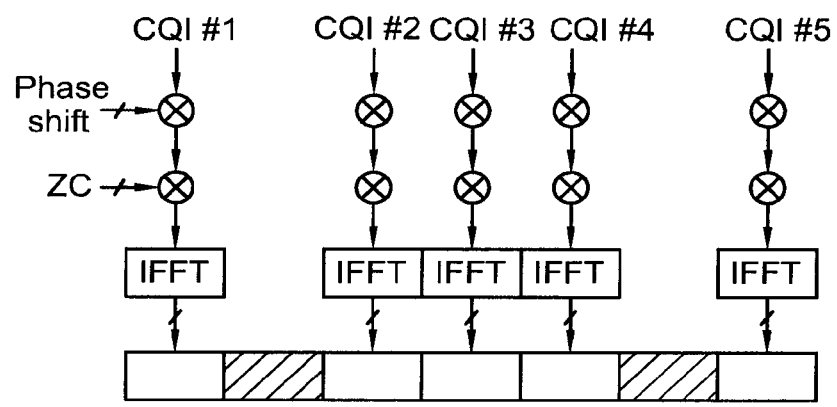
FIG. 8 shows a structure of a control channel according to another embodiment of the present invention.

FIG. 8 shows a structure of a control channel according to another embodiment of the present invention. With this structure, a small-sized control signal is multiplexed and transmitted through a CQI channel that can be regarded as a large-sized control channel.

Referring to FIG. 8, the small-sized control signal is multiplexed through phase-shift in consideration of a modulation scheme of a CQI that is a large-sized control signal. In this case, additional power allocation is not necessary and bandwidth loss does not occur. For example, if there is no phase shift, only the CQI may be transmitted, whereas if there is a phase shift of π/4, an SR may be transmitted by being multiplexed with the CQI.

The phase shift can be set differently for each slot, thereby increasing transmission capacity. The same phase-shift may be performed for 1 TTI or more so as to obtain a frequency diversity gain through frequency hopping and a time diversity gain through repetition.

Figure 9:
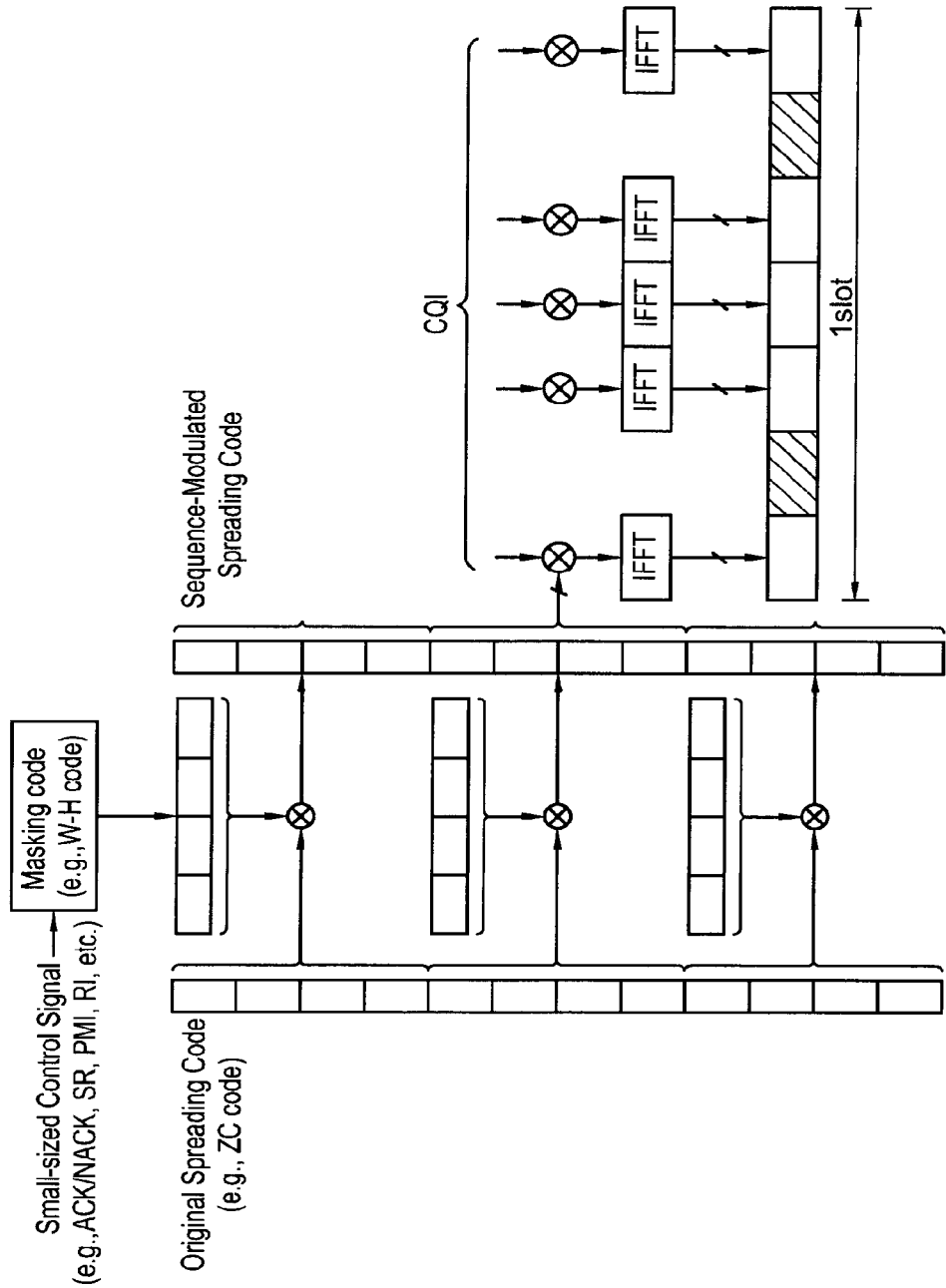
FIG. 9 shows a structure of a control channel according to another embodiment of the present invention.

FIG. 9 shows a structure of a control channel according to another embodiment of the present invention. With this structure, a small-sized control signal is multiplexed and transmitted through a CQI channel that can be regarded as a large-sized control channel.

Referring to FIG. 9, a specific sequence is selected according to the small-sized control signal, and the selected sequence is used as a masking code. It is assumed for example that a ZC sequence has a length of 12, corresponding to a length of one resource block. In addition, a W-H code having a length of 4 is used for a 2-bit small-sized control signal. One of the 4 W-H codes is selected as the masking code for the small-sized control signal. The ZC sequence having a length of 12 is segmented into 3 parts, and each segment is masked using the masking code. The masked sequence is used as a frequency-domain spreading code and thus is transmitted by expanding a CQI. The small-sized control signal is modulated through sequence modulation while maintaining a conventional characteristic of the ZC sequence. A receiver reproduces a multiplexed control signal by performing a de-spreading process on a sequence-modulated code, and then produces a CQI.

A diversity gain can be obtained when the same small-sized control signal is transmitted in one slot duration. Alternatively, a different small-sized control signal may be used for each OFDM symbol.

When the masking code is masked onto the ZC sequence, orthogonality may be influenced by a cyclic shift of the ZC sequence. As a result, a cyclic shift offset may be restricted. However, it is possible to control supportable UE capability and transmission capacity for a unit time period. For example, if a different control signal is mapped for each OFDM symbol through the W-H code having a length of 4, a maximum of 20 bits can be transmitted for one slot. This means that transmission capacity is approximately doubled.

Although the W-H code and the ZC sequence are described for sequence modulation as an example, other general orthogonal codes may also be used.

Transmission of Control Signal Using Multiple Resource Blocks

When a plurality of resource blocks (RBs) are assigned to transmit an uplink control signal, a frequency-domain spreading code is adjusted to fit a size of the assigned RBs in order to maintain a single carrier property. In the control channel structure shown in FIG. 5, the number of supportable UEs and transmission capacity per unit time are limited regardless of the number of assigned RBs. For example, a control channel constructed of two RBs supports UE capability of 6 and transmission capacity of 5 OFDM symbols per slot, which is the same as those supported by a control channel constructed of one RB. Therefore, according to the conventional control channel structure, transmission capacity cannot be increased even if a frequency resource is additionally allocated. As a result, spectral efficiency decreases. Accordingly, when a plurality of RBs are assigned, there is a need for a control channel structure capable of increasing transmission capacity by allocating additional frequency resources while maintaining an excellent PAPR/CM characteristic.

Figure 10:
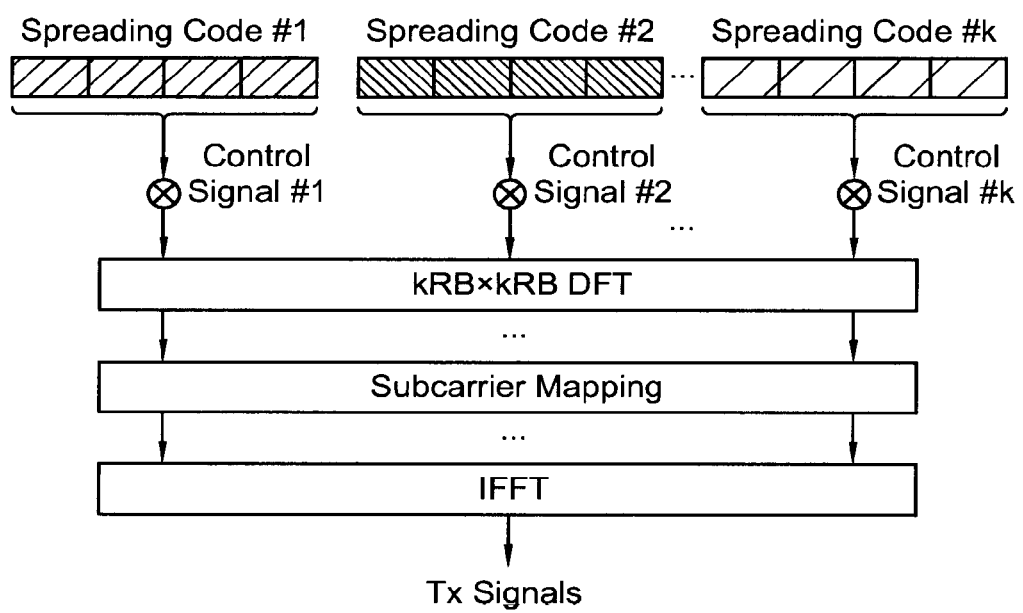
FIG. 10 shows an example of control signal transmission when multiple resource blocks are assigned.

FIG. 10 shows an example of control signal transmission when multiple RBs are assigned.

Referring to FIG. 10, when k RBs are assigned, k spreading codes are assigned. A control signal is mapped for each spreading code at a previous stage of DFT processing. A DFT-spread code is mapped to a subcarrier. Thereafter, the resultant code is subjected to IFFT and is then transmitted. Consequently, k control signals can be transmitted by assigning the k RBs. The spreading code can be used for intra-cell UE identification and/or cell identification. The same spreading code may be used. Alternatively, a different code may be used according to a control signal mapped thereto.

Although one spreading code is assigned for one RB herein, one spreading code may be assigned for a plurality of RBs. For example, one spreading code may be assigned for two RBs.

Transmission capacity increases k times higher than the conventional channel. According to required transmission capacity, spectral efficiency can be maximized through flexible frequency allocation.

Figure 11:
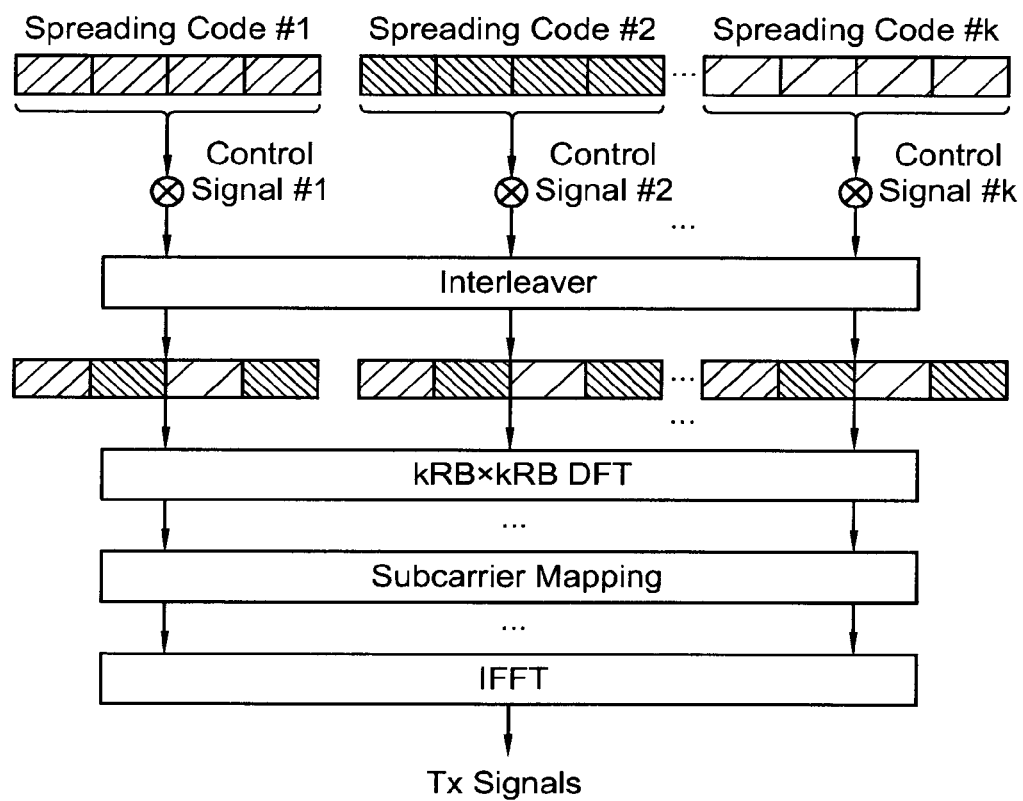
FIG. 11 shows another example of control signal transmission when multiple resource blocks are assigned.

FIG. 11 shows another example of control signal transmission when multiple RBs are assigned.

Referring to FIG. 11, in comparison with the embodiment of FIG. 10, control signals are spread through a spreading code at a previous stage of DFT processing and then are interleaved by using an interleaver. The interleaved signal is spread through DFT and is then mapped to a subcarrier. Thereafter, the resultant signal is subjected to IFFT and is then transmitted.

Figure 12:
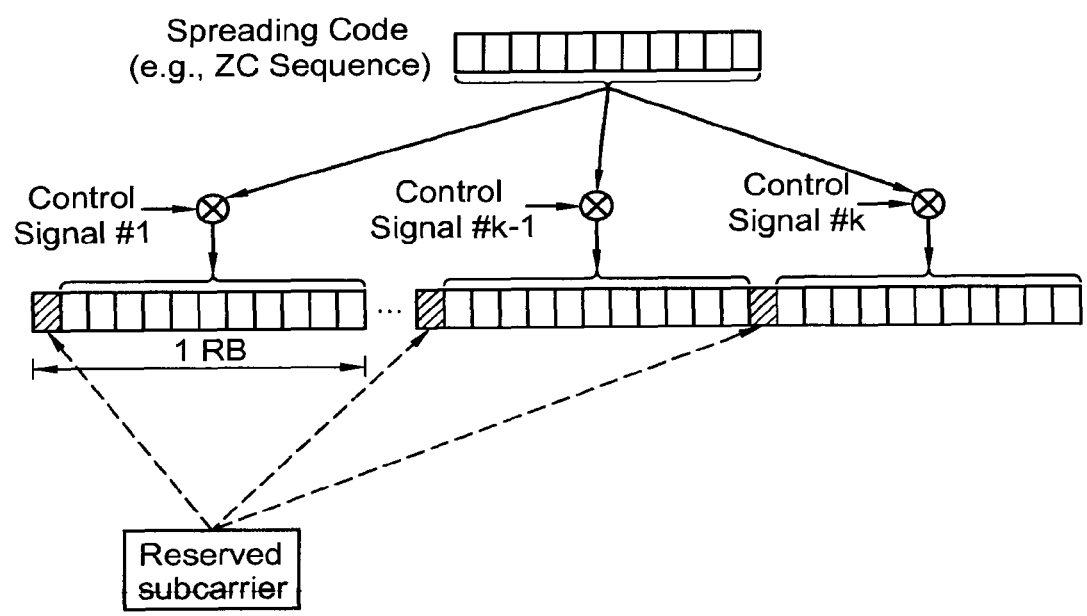
FIG. 12 shows an example of control signal transmission when multiple resource blocks are assigned.

FIG. 12 shows an example of control signal transmission when multiple RBs are assigned.

Referring to FIG. 12, if one RB includes 12 subcarriers, each of a plurality of RBs uses a ZC sequence having a length of 11 as a spreading code. A random code is assigned to the remaining one reserved subcarrier in order to improve the PAPR/CM characteristic. For K RBs, one subcarrier is reserved for each RB. Thus, random codes are assigned to K reserved subcarriers in order to improve the PAPR/CM characteristic.

The ZC sequence having a length of 11 may be directly used without alternation. A ZC sequence having a length of 12 may be truncated to be used as the ZC sequence having a length of 11. A ZC sequence having a length of less than 11 may be extended to be used as the ZC sequence having a length of 11.

Although a first subcarrier among 12 subcarriers constituting each RB is used as the reserved subcarrier, there is no restriction on the location of the reserved subcarrier. Thus, the reserved subcarrier may be positioned at a last subcarrier or a middle portion of each RB. In addition, one or more reserved subcarriers can be assigned for each RB. The number of reserved subcarriers assigned for the RBs may differ from one RB to another.

When one RB (i.e., 12 subcarriers) is assigned to the control channel in the conventional control channel structure, a ZC sequence having a length of 12 is used as a spreading code. If two RBs are assigned, a ZC sequence having a length of 24 is used as the spreading code. When a ZC sequence corresponding to one RB is used for two RBs, the PAPR/CM characteristic of the ZC sequence may be impaired. Accordingly, some of the assigned subcarriers are used for the purpose of improving the PAPR/CM characteristic.

A computational amount can be too high when the random codes are calculated for every transmission unit. In this case, a look-up table can be used. In general, a control signal uses a predetermined modulation scheme (e.g., QPSK) and a ZC sequence has a predetermined length. Therefore, a random signal to be mapped to a reserved subcarrier is pre-stored in the look-up table so that an excellent PAPR/CM characteristic can be provided according to transmittable data (i.e., the control signal).

Figure 13:
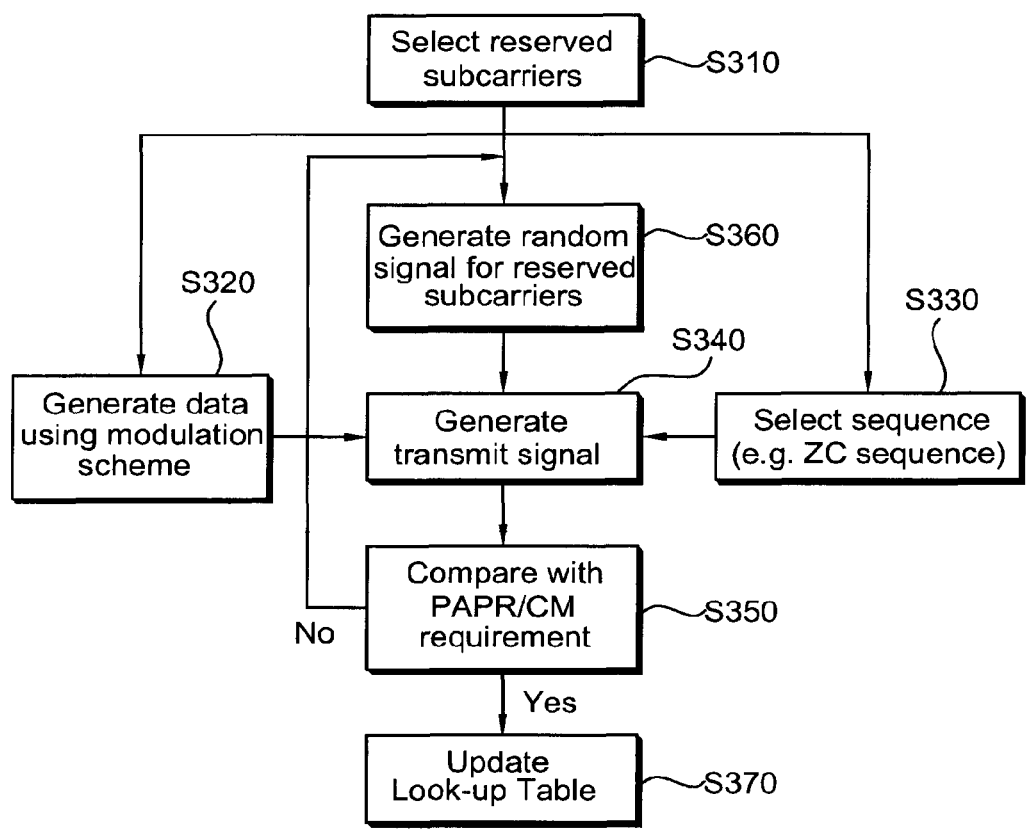
FIG. 13 is a flowchart showing a method of generating a reserved signal mapped to a reserved subcarrier.

FIG. 13 is a flowchart showing a method of generating a reserved signal mapped to a reserved subcarrier.

Referring to FIG. 13, in step S310, reserved subcarriers are selected from assigned resource blocks. In step S320, data is generated using a predetermined modulation scheme. In step S330, a sequence is selected. For example, when a resource block includes 12 subcarriers and uses one subcarrier as a reserved subcarrier, a ZC sequence having a length of 11 is selected. In step S340, a Tx signal is generated using data or the selected sequence. In step S350, the generated Tx signal is compared with a PAPR/CM requirement. If the PAPR/CM requirement is not satisfied, in step S360, a random signal is generated for the reserved subcarriers, and a new Tx signal is generated by mapping the random signal to the reserved subcarrier. It is determined whether the new Tx signal satisfies the PAPR/CM requirement. If the PAPR/CM requirement is satisfied, a lookup table is updated in step S370. The lookup table includes information regarding the modulation scheme, the sequence, the reserved subcarrier, and the random signal.

Figure 14:
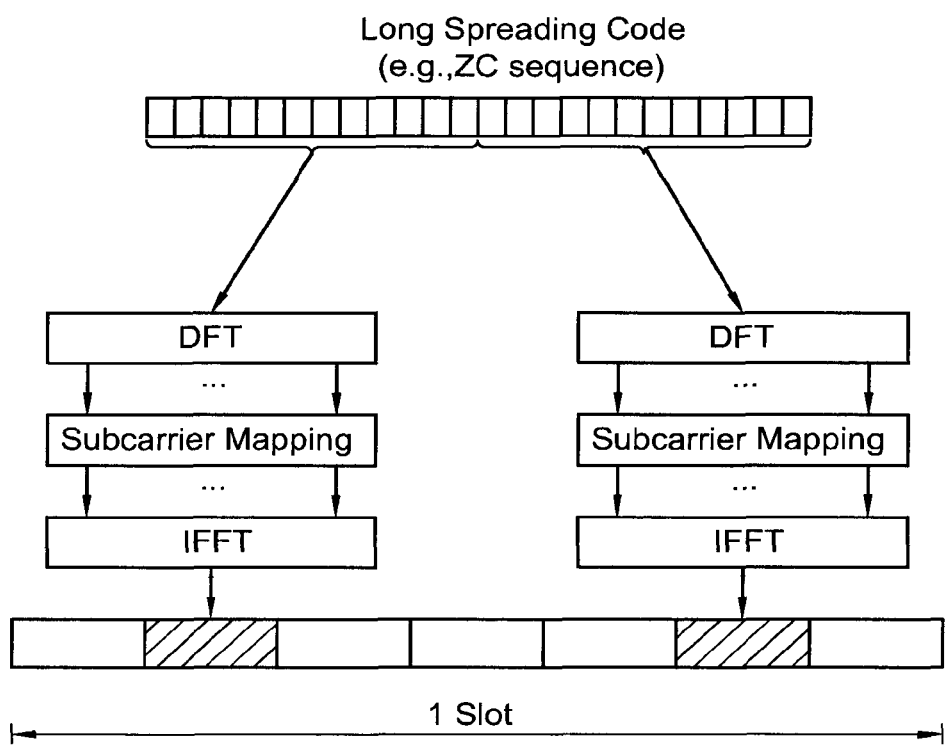
FIG. 14 shows an example of control signal transmission using a long spreading code.

FIG. 14 shows an example of control signal transmission using a long spreading code.

Referring to FIG. 14, UE identification and/or cell identification using the spreading code in a time or frequency domain are determined according to a length or characteristic of a code in use. A relatively short spreading code is not effective to remove inter-cell interference since it has generally a small cardinality of a code set. Therefore, the long spreading code is necessary for further effective inter-cell identification in a multi-cell environment. In a sequence (e.g., a ZC sequence), the PAPR/CM characteristic is maintained when all codes are used within a limited frequency resource. However, it is difficult to divide the sequence in the time domain and to map the sequence in the frequency domain. Therefore, the long spreading code is segmented, and each segment is subjected to DFT, subcarrier mapping, and IFFT. By doing so, an excellent PAPR/CM characteristic can be maintained. In addition, inter-cell identification can be easily achieved using the long spreading code.

Channel estimation can be more reliable when a reference signal is robust to inter-cell interference in a CQI channel assigned with two RS OFDM symbols. UE capability is only 6 in the conventional CQI channel structure. To obtain performance superior to that of the conventional method in terms of intra-cell UE identification or inter-cell identification, a ZC sequence having a double length may be segmented in a duration of two OFDM symbols Although the descriptions above have focused on the CQI channel, the technical features of the present invention may also apply to various types of control channels. For example, those skilled in the art will be able to easily apply the present invention to an ACK/NACK channel to be described below.

Figure 15:
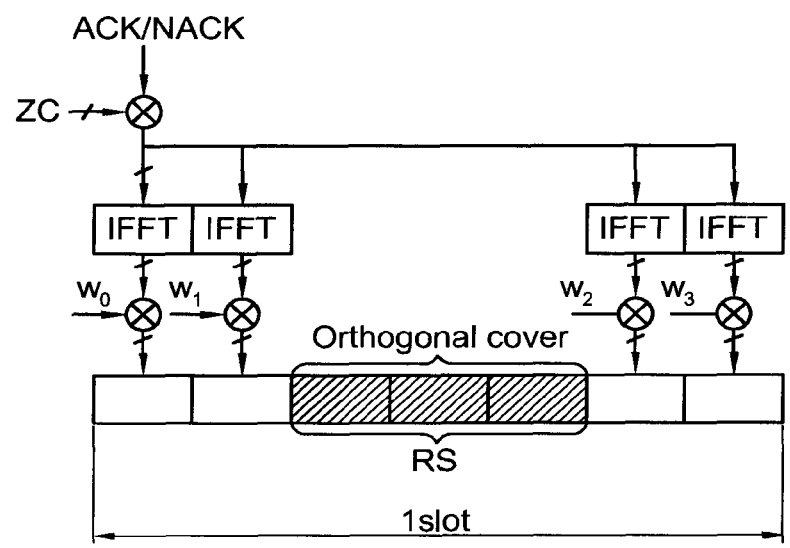
FIG. 15 shows a structure of an ACK/NACK channel.

FIG. 15 shows a structure of an ACK/NACK channel. The ACK/NACK channel is a control channel through which an ACK/NACK signal for HARQ is transmitted. The ACK/NACK signal is a transmission and/or reception confirm signal for downlink data.

Referring to FIG. 15, among 7 OFDM symbols included in one slot, a RS is carried on 3 contiguous OFDM symbols in the middle portion of the slot and the ACK/NACK signal is carried on the remaining 4 OFDM symbols. The RS is carried on the 3 contiguous OFDM symbols located in the middle portion of the slot. The location and the number of symbols used in the RS may vary depending on a control channel. Changes in the location and the number the symbols may result in changes in those symbols used in the ACK/NACK signal.

When the control signal is transmitted within a pre-assigned band, frequency-domain spreading and time-domain spreading are simultaneously used to increase the number of multiplexable UEs and the number of control channels. A frequency-domain spreading code is used to spread the ACK/NACK signal on a frequency domain. A ZC sequence may be used as the frequency-domain spreading code. The frequency-domain spread ACK/NACK signal is subjected to IFFT processing and is then spread again in a time domain by using a time-domain spreading code. The ACK/NACK signal is spread using 4 time-domain spreading codes w0, w1, w2, and w3 for 4 OFDM symbols. The RS is also spread using a spreading code having a length of 3.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting, by a user equipment (UE), a channel quality indicator (CQI) and an acknowledgement/non-acknowledgement (ACK/NACK) signal in a wireless communication system, the method comprising:

transmitting CQI bits which is mapped to a plurality of data symbols in a slot;

transmitting a control signal by multiplying (1, 1) to a first reference signal (RS) sequence and a second RS sequence if the control signal corresponds to a first value; or transmitting a control signal by multiplying (1, −1) to a first RS sequence and a second RS sequence if the control signal corresponds to a second value;

wherein the first RS sequence is mapped to a first RS symbol in the slot, and wherein the second RS sequence is mapped to a second RS symbol in the slot.

2. The method of claim 1, wherein the control signal corresponds to the acknowledgement (ACK)/non-acknowledgement (NACK) signal.

3. The method of claim 1, wherein a size of the control signal is 1 bit.

4. The method of claim 1, wherein the first value is 0, and wherein the first value corresponds to NACK.

5. The method of claim 1, wherein the second value is 1, and wherein the second value corresponds to ACK.

6. The method of claim 1, wherein the first RS symbol is a second symbol in the slot.

7. The method of claim 1, wherein the second RS symbol is a sixth symbol in the slot.

8. The method of claim 1, wherein the CQI bits are quadrature phase shift keying (QPSK) modulated.

9. The method of claim 1, wherein a number of the plurality of data symbols is 5.

10. The method of claim 1, wherein a size of the control signal is 2 bits.

11. A user equipment (UE) comprising:
an antenna; and
a processor coupled to the antenna, and configured to:
control the antenna to transmit CQI bits which is mapped to a plurality of data symbols in a slot;
control the antenna to transmit a control signal by multiplying (1, 1) to a first reference signal (RS) sequence and a second RS sequence if the control signal corresponds to a first value; or
control the antenna to transmit a control signal by multiplying (1, −1) to a first RS sequence and a second RS sequence if the control signal corresponds to a second value;
wherein the first RS sequence is mapped to a first RS symbol in the slot, and
wherein the second RS sequence is mapped to a second RS symbol in the slot.

12. The UE of claim 11, wherein the control signal corresponds to the acknowledgement (ACK)/non-acknowledgement (NACK) signal.

13. The UE of claim 11, wherein a size of the control signal is 1 bit.

14. The UE of claim 11, wherein the first value is 0, and wherein the first value corresponds to NACK.

15. The UE of claim 11, wherein the second value is 1, and wherein the second value corresponds to ACK.

16. The UE of claim 11, wherein the first RS symbol is a second symbol in the slot.

17. The UE of claim 11, wherein the second RS symbol is a sixth symbol in the slot.

18. The UE of claim 11, wherein the CQI bits are quadrature phase shift keying (QPSK) modulated.

19. The UE of claim 11, wherein a number of the plurality of data symbols is 5.

20. The UE of claim 11, wherein a size of the control signal is 2 bits.

* * * * *